United States Patent
Kerfoot, Jr. et al.

(10) Patent No.: US 9,553,341 B2
(45) Date of Patent: Jan. 24, 2017

(54) METHOD AND APPARATUS FOR CONTROLLING ACCESS TO A LOGIC CIRCUIT IN A BATTERY BY MULTIPLE COMPONENTS CONNECTED TO THE BATTERY

(71) Applicant: MOTOROLA SOLUTIONS, INC., Schaumburg, IL (US)

(72) Inventors: Roy L Kerfoot, Jr., Lilburn, GA (US); John E Herrmann, Suwanee, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 189 days.

(21) Appl. No.: 14/189,348

(22) Filed: Feb. 25, 2014

(65) Prior Publication Data

US 2015/0244183 A1    Aug. 27, 2015

(51) Int. Cl.
*H02J 7/00* (2006.01)
*H02J 7/04* (2006.01)
*H01M 10/42* (2006.01)

(52) U.S. Cl.
CPC .......... *H01M 10/425* (2013.01); *H02J 7/0004* (2013.01); *H02J 7/0031* (2013.01); *H02J 2007/0098* (2013.01)

(58) Field of Classification Search
USPC ....... 320/108, 137, 106, 109, 112, 118, 134, 320/136, 103, 104, 110, 113, 116; 307/140, 64, 307/80, 9.1; 323/234; 327/108, 434; 340/636.12
See application file for complete search history.

(56) References Cited

U.S. PATENT DOCUMENTS

| | | | |
|---|---|---|---|
| 5,534,765 A | 7/1996 | Kreisinger et al. | |
| 5,606,242 A | 2/1997 | Hull et al. | |
| 5,932,989 A | 8/1999 | Thandiwe et al. | |
| 6,316,916 B2 | 11/2001 | Bohne | |
| 6,681,278 B1 | 1/2004 | Jakl | |
| 7,449,863 B2 | 11/2008 | Tashiro | |
| 8,332,668 B2 | 12/2012 | Tupman et al. | |
| 9,111,603 B1* | 8/2015 | Wang et al. | G11O 5/147 |
| 2004/0207362 A1* | 10/2004 | Kanouda et al. | G06F 1/1632 320/104 |
| 2007/0216359 A1* | 9/2007 | Arai et al. | H02J 7/0093 320/130 |
| 2009/0051327 A1 | 2/2009 | Bohne | |
| 2009/0102511 A1* | 4/2009 | Hirose | H03K 19/00384 326/30 |

(Continued)

FOREIGN PATENT DOCUMENTS

EP    1719233 A2    11/2006

*Primary Examiner* — Alexis A Boateng
(74) *Attorney, Agent, or Firm* — Barbara R. Doutre; Scott M. Garret

(57) ABSTRACT

A method and apparatus for controlling access to a logic circuit in a battery by one or more components connected to the battery includes the components initially providing no voltage to a data contact, and sampling a voltage level at the data contact to determine if another component is presently connected to the logic circuit. When the sampled voltage indicates no other component is presently accessing the logic circuit, the component applies a voltage to the logic circuit via the data contact and access the logic circuit. When the sampled voltage indicates that a prior-connected component is connected to the battery, the component uses a voltage level provided by the prior-connected component to access the logic circuit.

11 Claims, 3 Drawing Sheets

(56) References Cited

U.S. PATENT DOCUMENTS

| | | |
|---|---|---|
| 2012/0315959 A1 | 12/2012 | Book et al. |
| 2012/0328094 A1 | 12/2012 | Pattenden et al. |
| 2013/0009464 A1* | 1/2013 | Firehammer et al. ................ H01M 10/425 307/9.1 |
| 2013/0026983 A1* | 1/2013 | Yamamoto et al. .. H02J 7/0055 320/108 |
| 2013/0069597 A1* | 3/2013 | Sugimura ................. H02J 7/00 320/118 |
| 2013/0162044 A1* | 6/2013 | Mangattur et al. ... G06F 1/3287 307/64 |
| 2014/0232345 A1* | 8/2014 | Sakurai et al. .... H03K 17/0822 320/118 |
| 2014/0306658 A1* | 10/2014 | Kinomura ........... B60L 11/1838 320/109 |

* cited by examiner

METHOD AND APPARATUS FOR CONTROLLING ACCESS TO A LOGIC CIRCUIT IN A BATTERY BY MULTIPLE COMPONENTS CONNECTED TO THE BATTERY

FIELD OF THE DISCLOSURE

The present disclosure relates generally to rechargeable battery systems, and more particularly to controlling access to a logic circuit in the battery that can be accessed by different components to which the battery can be connected at the same time.

BACKGROUND

A battery in a rechargeable system refers to a package containing several circuit elements, including one or more electrochemical cells, and can often include other circuitry. The package is mechanically adapted to attach to a device that is powered by the battery and to a charger that can recharge the battery while it is attached to the device, or by itself. It is common in some industries to include circuitry in the battery that can provide information to components such as a charger and a device powered by the battery. In some cases the circuitry can include a memory device that stores battery data.

Providing access to a circuit in the battery is a way that it can be accessed by both a charger and a device powered by the battery presents several problems. For one, different components (e.g. charger, device) can apply different voltage levels to the circuit being accessed. As such, if both components attempt to access the circuit, the difference in voltage could interfere with the operation of the circuit or output of the circuit as read by one or both components. In some cases the voltage difference could damage one of the components. In addition, even if all components were able to use identical voltage levels, each component being essentially an initiator and the logic circuit in the battery being a responder, there can be collisions in communication where both components attempt access at the same time.

Accordingly, there is a need for a method and apparatus for controlling access to a logic circuit in a battery by multiple components.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
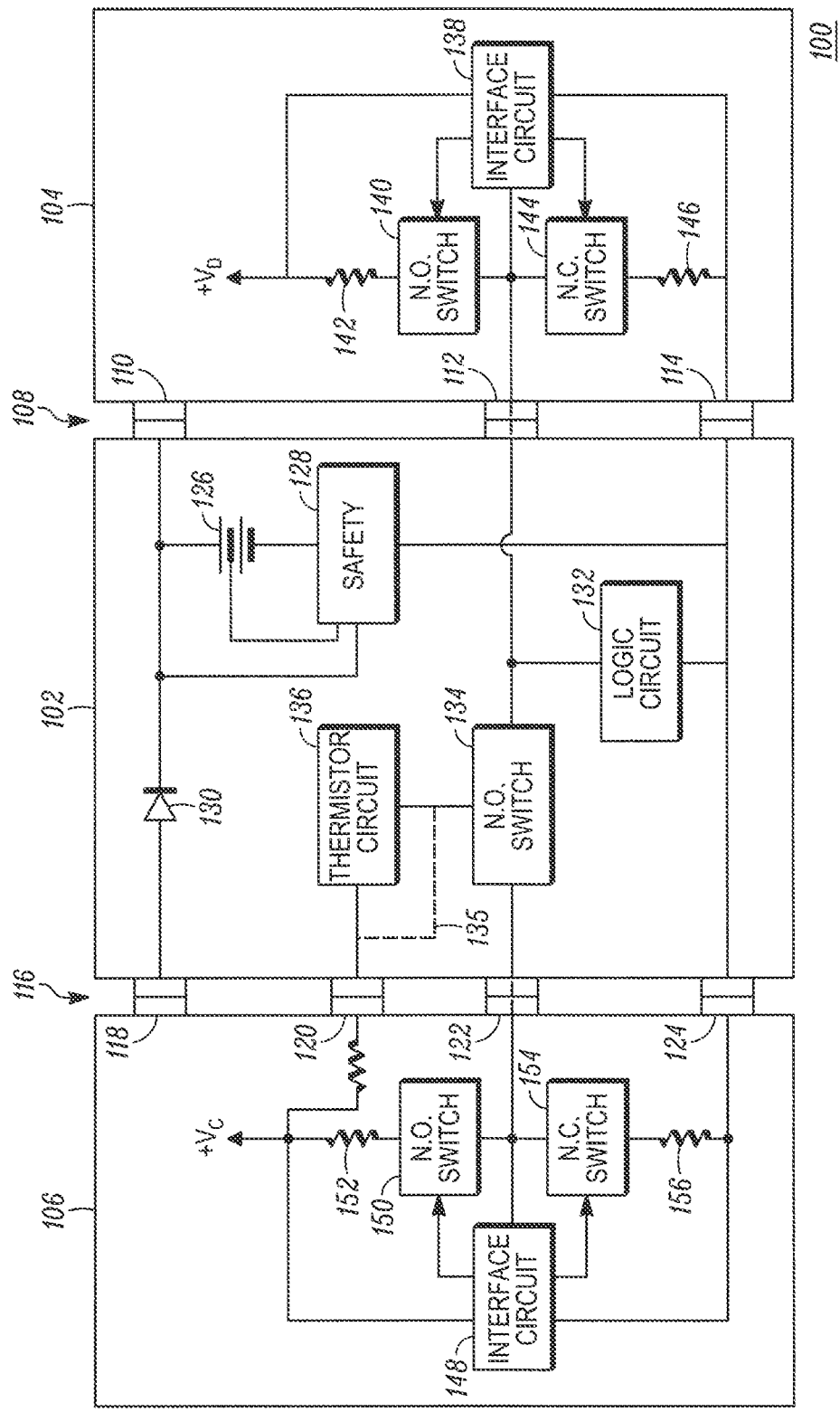
FIG. 1 is a block diagram of a rechargeable battery system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are exemplified by a method for interacting with a data line in a battery by component connected to the battery. In some embodiments the method includes setting a high side switch that is electrically in series with a pull up resistance between the data line and a voltage source in the component, and physically located in the component, to a normally open state. The method can further include setting a low side switch that is electrically in series with a pull down resistance between the data line and an electrical ground in the component, and physically located in the component, to a normally closed state. The method can also include sampling a present voltage level of the data line while the high side switch is in the open state and the low side switch is in the closed state. When the present voltage level is substantially equal to the electrical ground, the method closes the high side switch and opening the low side switch, thereby applying a bias voltage to a logic circuit in the battery.

FIG. 1 is a block diagram of a rechargeable battery system 100, in accordance with some embodiments. The system as exemplified here includes a battery 102 that can be attached or connected to other components such as, for example, a device 104 that is powered by the battery, and charger 106 that recharges the battery. As used here, the term "battery" refers to a package or battery pack that includes one or more electrochemical cells, other circuitry, a housing, and contacts to make electrical contact with other components.

The battery 102 includes a device set of contacts 108, that includes a positive device contact 110, a device data contact 112, and a negative device contact 114. The device contacts 108 are formed of electrically conductive material, with mating contacts on both the battery 102 and the device 104. The battery 102 also has a set of charger contacts 116, including a positive charger contact 118, a thermistor contact 120, a charger data contact 122, and a negative charger contact 124. One or more battery cells 126 are generally connected between the positive contacts 110, 118 and the negative contacts 114, 124. A safety circuit 128 can be included to prevent over-charge or over-discharge of the battery cells 126, and a charging diode 130 or equivalent can be used to prevent discharge through the positive charger contact 118. The battery 102 also includes a logic circuit 132. The logic circuit is a circuit that provides information about the battery 102. In some embodiments the logic circuit is a memory device that contains battery data such as an indication of the battery chemistry, voltage limits to be used in charging and using the battery, battery capacity, and so on. In some embodiments the logic circuit can provide dynamic information such as a present state of charge of the battery cells 126. As shown, the logic circuit 132 is directly connected to the device data contact 112, but between the logic circuit 132 and the charger data contact 122 is a normally open switch 134, which, while open, disconnects the logic circuit 132 from the charger data contact 122. The normally open switch 134 is present to prevent a voltage being evident at the charger data contact 122 when the battery 102 is not connected to the charger 106 in part to prevent Galvanic corrosion. The normally open switch 134 can be closed responsive to the switch signal or voltage provided by the charger 106 though another contact other than the charger data contact 122, such as, for example, the thermistor contact 120. The charger 106 provides a bias voltage to the thermistor contact 120 to bias a thermistor circuit 136. The thermistor circuit 136 includes at least a thermistor, and it changes the voltage at the thermistor contact 120 in correspondence with the temperature of the battery 102 which is detected by the charger 106 while charging the battery 102 to allow the charger 106 to adjust a charging regimen used to charge the battery 102. Upon the bias voltage being applied to the thermistor circuit 136, it can be provided to an input or control of the normally open switch 134, causing the normally open switch 134 to close, thereby connecting the logic circuit 132 to the charger data contact 122. In some embodiments the voltage provided to the thermistor contact, or whichever contact is used in various embodiments, can be provided directly to the normally open switch 134, as indicated by line 135. The input to the normally open switch 134 is a high impedance, and thus will not significantly load the signal level at the thermistor contact 120.

Both the device 104 and the charger 106 are therefore able to access the logic circuit via their respective device and charger data contacts 112, 122. Both use a similar arrangement of switches to apply, or not apply voltage to the logic circuit 132. In each of the device 104 and the charger 106 a normally open switch 140, 150 is connected in series, respectively, with the pull up resistor 142, 152 between the corresponding data contact 112, 122 and a voltage source. Being normally open, they are normally in a very high impedance state that is electrically equivalent to an open circuit. Similarly, both the device 104 and charger 106 have a normally closed switch 144, 154, respectively, electrically connected in series with a respective pull down resistor 146, 156 between the corresponding data contact 112, 122 and ground (i.e. the potential at the negative contacts 114, 124). Both the device 104 and charger 106 have an interface circuit 138, 148, respectively. Each interface circuit 138, 148 is operable to control the corresponding normally open switch 140, 150 and corresponding normally closed switch 144, 154, as well as being able to sample a voltage level at its corresponding data contact 112, 122 and communicate with the logic circuit 132.

When either the device 104 or charger 106 is connected to the battery 102, no voltage is initially provided to the respective data contact 112, 122 because the normally open switches 140, 150 are open and the normally closed switches 144, 154 are closed, pulling the respective data contacts 112, 122 to ground through the respective pull down resistors 146, 156. The charger 106 applies a voltage to the thermistor contact, causing the normally open switch 134 to close, thereby electrically connecting the logic circuit 132 to the charger data contact 122. Upon determining that the battery 102 has been connected to the device 104 or charger 106, the respective interface circuit 138, 148 initially samples or measures the voltage at the corresponding data contact 112, 122. If the sampled voltage is low, or otherwise indicates that no voltage is being applied to the logic circuit, then no other component is presently accessing the logic circuit, the interface circuit switches the corresponding normally open switch 140, 150 to close, and the corresponding normally closed switch 144, 154 to open, thereby applying a voltage to the logic circuit, enabling the interface circuit 138, 148 to interact with the logic circuit. However, if the interface circuit 138, 148 initially detects a sufficiently high voltage at its respective data contact 112, 122, then that indicates another component is presently accessing the logic circuit 132, and the states of the normally open switch 140, 150 and the normally closed switch 144, 154 will not be changed. In some embodiments, the respective interface circuits 138, 148 can periodically re-sample the voltage at its corresponding data contact 112, 122 in reattempting to access the logic circuit 132. In some embodiments the interface circuits 138, 148 use a single wire communication protocol to communicate with the logic circuit. A single wire communication protocol is one where both requests for data and the response are sent over the same line or wire. In the present example, the interface circuit 138 or 148 transmits a coded digital command to the logic circuit 132 via line connected to the data contacts 112, 122, and the logic circuit 132 then responds by transmitting a digital response. The interface circuits 138, 148 and logic circuit 132 use a known bit timing for each individual bit, and can use a known prefix word to indicate a transmission is following.

Figure 2:
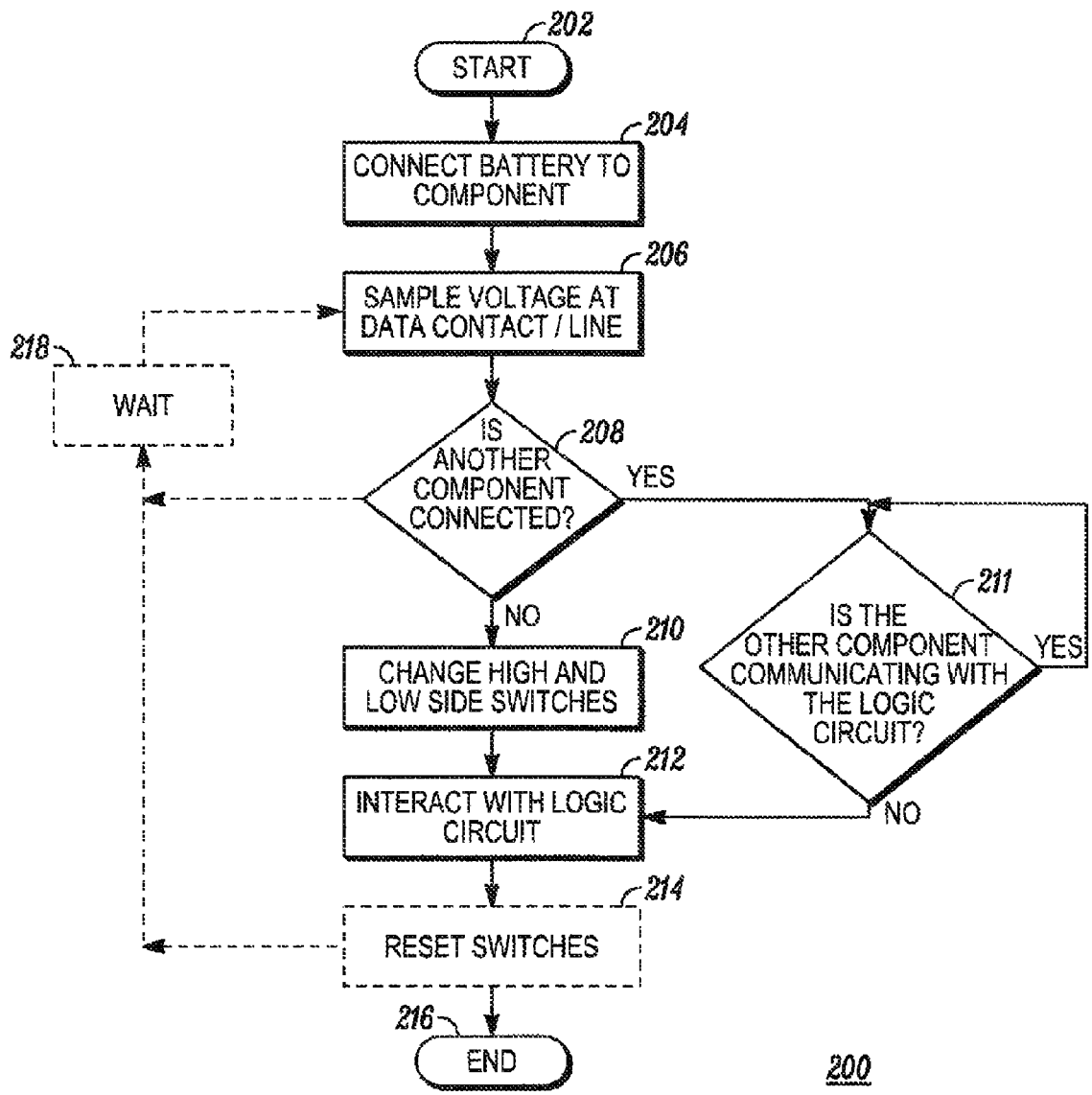
FIG. 2 is a flowchart of a method of controlling access to a logic circuit in a battery by multiple components connected to the battery, in accordance with some embodiments.

FIG. 2 is a flowchart of a method 200 of controlling access to a logic circuit in a battery by multiple components connected to the battery, in accordance with some embodiments. At the start 202, the battery may or may not be already attached to one component (i.e. the device or charger). The method illustrates an exemplary process undertaken by a component upon the component being connected to the battery. Thus, in step 204, the battery is connected to a component, and the battery is detected by the component, such as upon turning on a device to which the battery has been attached, or by a charger detecting an appropriate change at one or more of the charging contacts caused by the presence of the battery. In step 206, the interface circuit of the component samples the voltage at its data contact. In step 208 the sampled voltage is evaluated by the interface circuit to determine whether another component is connected to the battery. If there is no sufficient voltage to indicate another component is presently connected to the logic circuit in the battery, then the method 200 moves to step 210 where the interface circuit changes the normally open or high side switch to close, and the normally closed or low side switch to open, thereby applying a pull up voltage to the logic circuit. In step 212 the component interacts with the logic circuit to obtain information about the battery.

In some embodiments once a component is connected to the battery, and applies a pull up bias voltage the logic circuit through the data contact, the component can simply remain in that state until disconnected from the battery (or turned off) and the method 200 can end. In some embodiments, however, once the interface circuit has finished interacting with the logic circuit, in optional step 214 the high side and low side switches can be reset to the normal states, thereby removing bias from the logic circuit, allowing another component to power and interact with the logic circuit.

In some embodiments, in step 208, when the component determines that a prior-connected component (since it was connected prior) is presently connected to the battery, based on the presence of a voltage on the data line, the component can simply use the voltage being supplied by the prior-connected component and skip step 210 and proceed to step 212 to interact or communicate with the logic, leaving it's high side switch open and its low side switch closed. In the event that a prior-connected component is presently attached to the battery, as indicated by the voltage level on the data line, the component can, as in step 211, wait until the other component (that is providing the voltage) finishes communicating with the logic circuit before proceeding to step 212 by, for example, determining that no activity has occurred for a sufficient period of time on the data line.

In embodiments where the component accessing the logic circuit resets its switches in step 214, the method 200 can end 216, or, if the interface circuit needs to access the logic circuit again, after waiting a period of time in step 218, a substantial portion of the method 200 can be repeated starting at step 206. Likewise, in step 208, if it is determined that there does appear to be another component connected to the battery and accessing the logic circuit, rather than simply ending the method 200 as in some embodiments, the method 200 can alternatively wait a period of time in step 218 and commence step 206 again until the other component is no longer applying bias voltage to the logic circuit.

Figure 3:
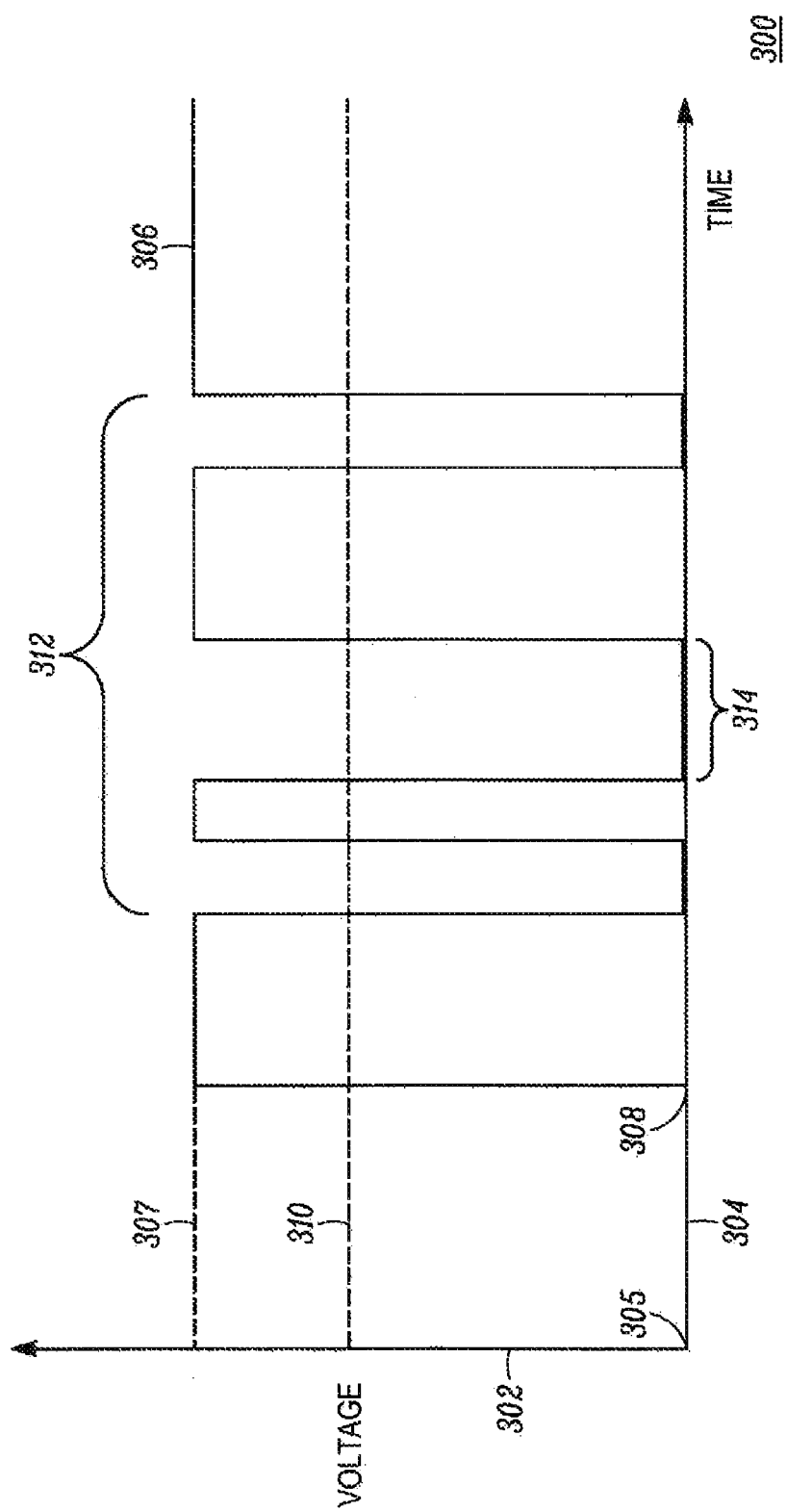
FIG. 3 is a graph diagram of a single wire communication protocol in communicating with a logic circuit in a battery, in accordance with some embodiments.

FIG. 3 is a graph diagram 300 of a single wire communication protocol in communicating with a logic circuit in a battery, in accordance with some embodiments. The graph diagram 300 illustrates, in part, a single wire communication protocol. The vertical axis 302 represents voltage at a data contact as line 306, such as device data contact 112 or charger data contact 122 of FIG. 1, as observed by an interface circuit such as device interface circuit 138 or charger interface circuit 148 of FIG. 1. The horizontal axis 304 represents time. Initially, at the origin 305, there is no voltage. At time 308 a component (i.e. either a charger or device powered by the battery) applies a voltage at level 307. The interface circuit applying the bias voltage communicates with the logic circuit in the battery during time period 312, where the logic circuit drives the voltage low for a logical "zero" and lets it return to the bias level 307 for a logical "one" in accordance with a predefined timing. As can be seen in time period 314, several logical zeros in a row can make it appear to another component that there is no voltage being applied to the logic circuit. Thus, when sampling the voltage at its data contact, as in step 206 of FIG. 2, care must be taken to rule out a false reading during a logical zero while another component is accessing the logic circuit. Given that there is no urgency in accessing the logic circuit, the sampling can be taken at several intervals over a time period sufficient to let another component finish accessing the logic circuit. Additionally, since other components may use different bias voltage levels, a lower threshold 310 can be set to indicate the presence of a bias voltage at the logic circuit.

Accordingly, the embodiments provide the benefit of allowing multiple different components to access a logic circuit, such as a memory, in a battery. In addition, by normally disconnecting the logic circuit from the charger data contact with a normally open switch, when the battery is connected to a device powered by the battery the potential for Galvanic corrosion of the charger data contact is avoided. In some embodiments when a component is finished accessing the logic circuit, it can remove bias and allow another component to access the logic circuit. In some embodiments, as when the logic circuit provides dynamic battery data, the components can repeatedly access the logic circuit at intervals over time while connected to the battery.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A rechargeable battery system, comprising:
    a battery including a logic circuit; and
    a component connected to the battery, the component comprising:
        a set of contacts for connecting to the battery, including a data contact;
        a high side switch that is electrically in series with a pull up resistance between the data contact and a voltage source in the component, and that is in a normally open state;
        a low side switch that is electrically in series with a pull down resistance between the data contact and an electrical ground in the component, and that is in a normally closed state;
        an interface circuit connected to the data contact that, when the high side switch is in an open state and the low side switch is in a closed state, samples a voltage level at the data contact to determine whether another component is connected to the battery; and
    wherein when the interface circuit determines that the voltage at the data contact indicates no other device is connected to the battery, the component changes the high side switch to a closed state and the low side switch to an open state, and thereafter the interface circuit communicates with the logic circuit in the battery through the data contact.

2. The rechargeable battery system of claim 1, wherein, upon the interface circuit completing communication with the logic circuit, the component opens the high side switch and closes the low side switch.

3. The rechargeable battery system of claim 1, wherein the interface circuit communicates with the logic circuit using a single wire communication protocol.

4. The rechargeable battery system of claim 1, wherein the component is a portable device that is powered by the battery, and wherein the voltage source is derived from a battery voltage provided by the battery.

5. The rechargeable battery system of claim 1, wherein the component is a charger and wherein the charger further provides a voltage to a different contact that is not the data contact to close a switch in the battery that is electrically in series between the logic circuit and the data contact.

6. The rechargeable battery system of claim 5, wherein the different contact is a thermistor contact.

7. The rechargeable battery system of claim 6, wherein, while the interface circuit communicates with the logic circuit, the charger determines a present temperature of the battery over the thermistor contact.

8. The rechargeable battery system of claim 1, wherein the interface circuit determines whether another component is connected to the battery by detecting a low voltage at the data contact for a preselected period of time.

9. The rechargeable battery system of claim 1, wherein the component is a portable device that is powered by the battery, and wherein the another component is a charger for the battery of the portable device.

10. The rechargeable battery system of claim 1, wherein the rechargeable battery system is a rechargeable battery system for portable devices.

11. The rechargeable battery system of claim 1, wherein when the battery is connected to a component comprising a portable device and not connected to a charger, Galvanic corrosion of a charger data contact is prevented by disconnecting a logic circuit of the battery with a normally open switch within the battery.

* * * * *